United States Patent [19]
Fassauer

[11] Patent Number: 5,222,349
[45] Date of Patent: Jun. 29, 1993

[54] AIR-FLOATED APPARATUS HAVING VACUUM MODULE AND RETRACTABLE BLADE MECHANISM, AND AUXILIARY DRIVE THEREFOR

[76] Inventor: Arthur L. Fassauer, P.O. Office Box 124, Canyon, Tex. 79015

[21] Appl. No.: 683,324

[22] Filed: Apr. 10, 1991

Related U.S. Application Data

[63] Continuation-in-part of Ser. No. 528,718, May 24, 1990.

[51] Int. Cl.⁵ ............................................. A01D 87/00
[52] U.S. Cl. ..................................... 56/12.8; 15/300.1
[58] Field of Search ............... 56/12.8, 12.9, 13.1–13.4, 56/16.7, 17.1, 475, 479; 15/300 R

[56] References Cited
U.S. PATENT DOCUMENTS

| | | | |
|---|---|---|---|
| 3,293,836 | 12/1966 | Heth | 56/12.8 |
| 4,361,001 | 11/1982 | Almond et al. | 56/12.8 |
| 4,817,372 | 4/1989 | Toda et al. | 56/12.8 |
| 5,048,275 | 9/1991 | Fassauer | 56/12.8 |

FOREIGN PATENT DOCUMENTS

2028089 3/1980 United Kingdom ................. 56/12.8

Primary Examiner—Thuy M. Bui
Attorney, Agent, or Firm—Ross, Howison, Clapp & Korn

[57] ABSTRACT

The present invention describes an air-floated apparatus comprising a housing having an outer shroud and an inner shroud, the outer shroud surrounding a predetermined portion of the inner shroud to define a pressure chamber between the inner and outer shrouds and a vacuum chamber within the inner shroud. A drive mechanism includes a motor having a rotatable shaft. A single impeller is supported in the pressure chamber and rotates on the shaft for exhausting air from the vacuum chamber to erect grass underlying the opening while simultaneously pressurizing air in the pressure chamber to float the apparatus above the grass. The apparatus further includes a cutting disk rotatable on the shaft and supported in a bottom opening of the inner shroud to substantially enclose the vacuum chamber. The cutting disk includes multiple retractable blades for cutting the grass. Several types of auxiliary drive mechanisms are also disclosed for use in facilitating advancement of the housing in a self-propelled manner.

19 Claims, 5 Drawing Sheets

AIR-FLOATED APPARATUS HAVING VACUUM MODULE AND RETRACTABLE BLADE MECHANISM, AND AUXILIARY DRIVE THEREFOR

This application is a continuation-in-part of prior copending application Ser. No. 07/528,718, filed May 24, 1990.

TECHNICAL FIELD

The present invention relates generally to an air-floated apparatus, such as a lawn mower, that floats on an air cushion during operation and that includes an inverted impeller, a vacuum module and a retractable blade mechanism that together cooperate to provide enhanced operation over conventional lawn mowers and other hover-type devices. The apparatus may also include an auxiliary drive mechanism such as a self-propelled drive wheel or wheeled platform whose level is adjustable relative to the main housing of the air-floated apparatus.

BACKGROUND OF THE INVENTION

It is known in the prior art to provide an air-supported or "hover" apparatus. Generally, such devices include a substantially-enclosed housing and means for generating air pressure within the housing to provide an air cushion to float the housing over a support surface. Examples of such devices are shown in U.S. Pat. Nos. 3,170,276, 3,293,836 and 4,245,455, and U.K. Patent Specification No. 1,534,021.

While air-floated devices of the prior art have significant advantages over conventional wheeled products, such devices have certain inherent problems which have yet to be overcome. In particular, such devices typically include an outer housing having a narrow peripheral edge, bezel or seal. During operation, air blown toward the ground by the air pressure means tends to escape from the housing between the ground an the narrow edge structure, which substantially reduces the lifting force on the housing. The rapid escape of air along the periphery of the mower housing also stirs up dust and debris when mowing around shrubbery and the like, which makes mowing difficult and hazardous. Also, because the air is blown downward to keep the housing afloat, the air pressure depresses the grass, causing the cutting blade to leave an uneven cut. Other problems include the inability to maintain lateral or side-to-side stability of the device.

Another disadvantage of prior art air-cushioned mowers is their inability to discharge grass cuttings, which leaves a windrow of cuttings that must be raked up after mowing. Conventional lawn mowers tend to vacuum up grass by the rotary action of the cutting blade. In prior art air-cushioned mowers, however, downwardly blown air pressure used to create the lifting force by ground effect is not sufficient to effectively discharge grass cuttings. In other words, prior art air-cushioned mowers have not been able to maintain adequate flotation while simultaneously discharging grass clippings from a port.

It is known in the prior art to provide a hover-type apparatus in which air is recycled by the suction side of the impeller used to float the housing. One such system is shown in FIG. 5 of U.S. Pat. No. 4,738,086 to Dunn. A similar teaching is shown in FIG. 2 of U.S. Pat. No. 4,361,001 to Almond, et al. While such systems have some advantages, they do not solve the above-identified problems. Moreover, these systems teach only recycling of air; the clippings themselves are not recycled.

It would therefore be desirable to provide an improved air-floated apparatus that overcomes these and other problems associated with the prior art.

BRIEF SUMMARY OF THE INVENTION

It is an object of the present invention to provide an air-floated apparatus, such as a lawn mower, that floats on an air cushion during operation.

It is still a further object of the invention to describe an air-floated apparatus that is simple to construct, has few moving parts and which is easy to maintain.

It is an object of the invention to provide an air-floated apparatus that includes an impeller supported in a novel manner to simultaneously float the apparatus and to create a partial vacuum chamber for standing grass underlying the apparatus prior to cutting.

It is still another object of the invention to provide an air-floated apparatus that has improved stability and gliding maneuverability.

It is yet a further object to provide an improved "hover" apparatus which includes an inverted impeller, a vacuum module and a retractable blade mechanism that together cooperate to provide enhanced operation over conventional lawn mowers and other hover-type devices. The apparatus may also include an auxiliary drive mechanism such as a self-propelled drive wheel or wheeled platform whose level is adjustable relative to the main housing of the air-floated apparatus.

It is another object of the invention to provide an air-cushioned lawn mower in which the channeling of air pressure for flotation is separated from the cutting of grass to facilitate efficient transport of particulate material.

It is a still further object of the invention to provide an air-cushioned lawn mower for use in mulching grass clippings.

It is another object to provide a hover-type lawn mower that includes a vacuum module for use in vacuuming and recycling grass cuttings to generate ultrafine cuttings which are then blown back into the ground throughout a predetermined radial area of the mower housing up to 360 degrees. The amount of vacuum generated by the vacuum module is readily adjustable by an adjustable air intake mechanism.

These and other objects of the invention are provided in an air-floated apparatus comprising a housing having an outer shroud and an inner shroud, the outer shroud surrounding a predetermined portion of the inner shroud to define a pressure chamber between the inner and outer shrouds and a vacuum chamber within the inner shroud. A drive mechanism includes a motor having a rotatable shaft. A single impeller is supported in an inverted manner in the pressure chamber such that its vacuum side faces downward into the vacuum chamber. The impeller rotates on the shaft for exhausting air from the vacuum chamber to erect grass underlying the opening while simultaneously pressurizing air in the pressure chamber to float the apparatus above the grass. The apparatus further includes a cutting disk rotatable on the shaft and supported in a bottom opening of the inner shroud to substantially enclose the vacuum chamber. The cutting disk includes multiple retractable blades for cutting the grass.

The apparatus preferably includes a vacuum module attached to or integrally formed with the outer shroud.

The vacuum module includes a vacuum slot which is coupled to the vacuum chamber to suction grass clippings into the slot. The grass clippings are suctioned or "vacuumed" to and through the vacuum chamber into the vacuum side of the impeller and then to and through the pressure chamber where they are then driven back into the ground by the pressurized air. Preferably, the vacuum module further includes an agitator supported in the vacuum slot for stirring up grass debris to enhance suctioning.

According to other features of the invention, the cutting blades of the cutting disk are retractable, with each blade being in a first retracted position when the cutting disk is at rest or idling at low speed and a second extended position when the cutting disk is rotated on the shaft. The cutting disk itself enhances the hovering operation by substantially enclosing the vacuum chamber (except for a small circular section in which the extended cutting blades rotate). The cutting disk preferably includes one or more vertically-extending fans for disturbing the cut grass clippings following cutting. Optionally, a dicing module is supported on the motor shaft and . selectively positioned adjacent one or more fixed dicing blades located between the Pressure and vacuum chambers. After the grass is initially cut by the retractable blades of the cutting disk, these cuttings are airborne and are drawn into the pressure chamber by the vacuum stream within the vacuum chamber. As the cuttings pass between the vacuum chamber and the vacuum side of the impeller (and thus into the pressure chamber), they are cut again into more fine cuttings by the dicing module and the fixed dicing blades.

The structure of the cutting disk facilitates the maintenance of a partial vacuum in the vacuum chamber sufficient to erect the underlying grass for cutting by the extensible blades and to suction grass debris into the vacuum slot. The actual amount of vacuum is selectively controlled by an adjustable air intake valve that delivers intake air if necessary into the vacuum chamber.

According to another significant feature of the invention, the air-floated apparatus includes an auxiliary drive mechanism such as one or more self-propelled drive wheels or a stand-on or tractor-type wheeled platform. In these embodiments, the air-floated apparatus includes the above-described vacuum module but the air cushion used to float the apparatus is generally directed throughout a predetermined frontal area of the housing (when the wheels are rear-mounted). A manual or automatic adjustment means is also provided for presetting the relative level of the platform and the housing to adjust the depth of cut. By dynamically varying the impeller speed (which determines the level of the airfloat frontal portion of the housing), the operator can thus match the preset position of the mower deck housing.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

Similar reference characters refer to similar parts throughout the several views of the drawings.

DETAILED DESCRIPTION

Figures 1, 1A:
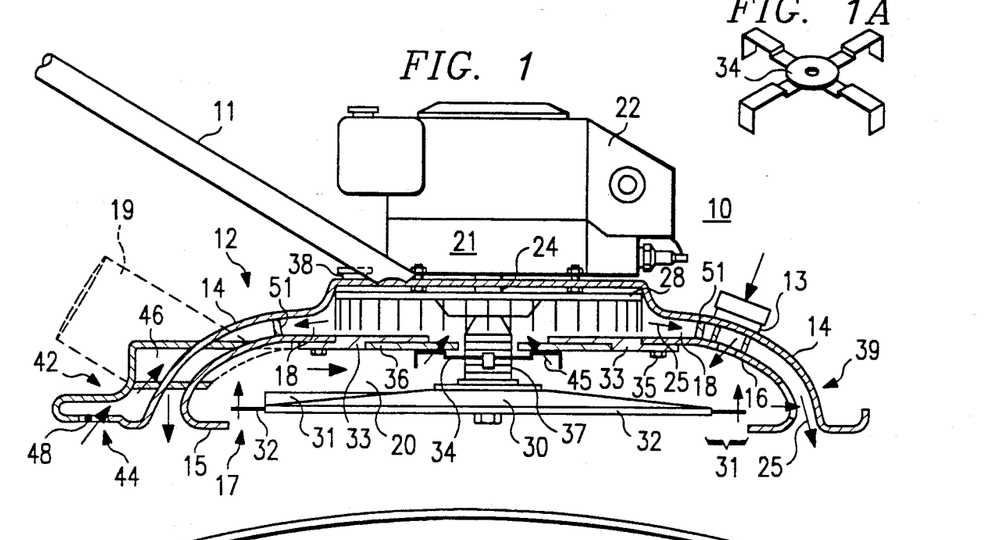
FIG. 1 is a sectional view of an air-floated apparatus according to the present invention.
FIG. 1A is a perspective view of the mulching module.
Figure 2:
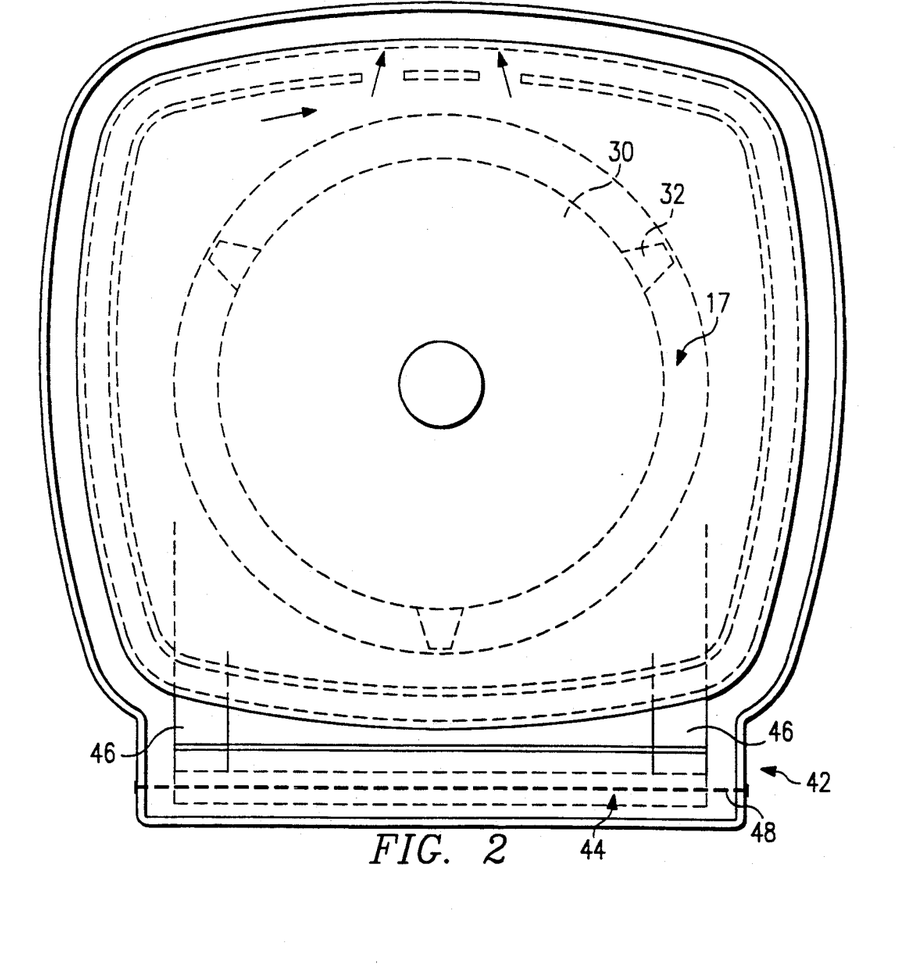
FIG. 2 is a plan view of the air-floated apparatus of FIG. 1.

Referring now to FIG. 1, a sectional view, partially cutaway, is shown of an air-floated apparatus 10 for use as a rotary lawn mower. Air-floated apparatus 10 includes a housing 12 having an outer shroud 14 and an inner shroud 16, the outer shroud 14 substantially surrounding the inner shroud 16 to define a (substantially 360 degree) pressure chamber 18 between the inner and outer shrouds and a vacuum chamber 20 within the inner shroud. The outer shroud supports the inner shroud using a plurality of radically-positioned structural members 51. The inner shroud includes a bottom opening 17 defined by an inner periphery of an integral plate member 15. The opening 17 is preferably circular as best seen in FIG. 2. Each of the shrouds is generally square or trapezoidal in shape and preferably made of plastic material formed by an injection molding process to provide a lightweight housing. An air intake and balance assembly 13 is supported in the outer and inner shrouds for delivering intake air into the vacuum chamber 20. The air intake includes an adjustment valve (such as a threaded cap) that selectively adjusts the amount of intake air drawn into the vacuum chamber. The air intake is generally closed because sufficient air underlying the housing can be drawn into the vacuum chamber. If additional air or a balancing of the vacuum and pressure is needed, the air intake is adjusted. A conventional handle 11 is secured to the housing in the normal fashion.

The apparatus includes a drive mechanism 21 that includes a motor 22 having a rotatable shaft 24. The motor 22 can be an AC or DC electric motor or, alternatively, a conventional lawn mower gasoline engine. A single impeller 28 is supported in an inverted or "upside-down" manner in the pressure chamber 18 and rigidly secured to the shaft 24. The impeller 28 is preferably comprised of lightweight plastic material and may be formed by injection molding. The impeller rotates on the shaft 24 for drawing intake air from below the housing (and, if necessary, through the air intake 13) and exhausting such air from the vacuum chamber 20 to create a partial vacuum in the chamber 20 sufficient to erect grass underlying the opening 17. Simultaneously, the air is pressurized in the pressure chamber 18 and driven into the ground about a substantially 360 degree periphery of the housing to float the apparatus above the grass. This primary air flow is evidenced by the arrows 25. The impeller 28 has a greater than normal height and thus surface area because a large mass of air must be pressurized in order to float the housing while simultaneously creating the partial vacuum in the inner shroud.

The apparatus further includes a cutting disk 30 rotatable on the shaft and supported in a bottom opening 17 of the inner shroud to substantially enclose the vacuum chamber 20 except for a small circular region 31 as best seen in FIG. 2. The cutting disk includes at least blade 32 for cutting the grass.

The cutting disk 30 preferably also includes one or more vertically-extending fans 31 (or other suitable air disturbance means) for disturbing the cut grass clippings following cutting. Optionally, a mulching module 34 is supported on the motor shaft between a pair of spacers 37 and selectively positioned adjacent one or more fixed blades 36 located between the pressure and vacuum chambers. The blades are affixed to first and second support plates 33 that are removably secured to the inner shroud by fasteners 35. After the grass is initially cut by the retractable blades of the cutting disk, these cuttings are drawn into the pressure chamber by the vacuum stream created by the vacuum side of the impeller. As the cuttings pass between the vacuum chamber and the pressure chamber, they are cut again into more fine cuttings by the mulching module 34 and the fixed blades 36. FIG. 1A shows the preferred construction of the mulching module 34.

Upon loosening of the fasteners 35, the support plates 33 are removed to facilitate removal of the impeller for service and cleaning. As an alternative, a clean-out assembly 38 is provided. The assembly includes a removable threaded cap to enable a water hose to be placed into or threaded to the assembly. Water is then directed into and forced through the pressure chamber to effect a cleaning of this chamber. Such cleaning is effected even while the impeller is rotating.

A discharge duct 19 is available but is sealed when the impeller is in the inverted position shown; if the inverter is turned upright (vacuum side up), the pressure chamber becomes the vacuum chamber and vice versa. In such configuration, the discharge duct 19 is open (or connected to a grass catching receptacle) for discharging clippings. Thus the same mower elements are suitable for both types of designs.

Referring now simultaneously to FIGS. 1 and 2, the apparatus also preferably includes a vacuum module means 42 supported along or integrally formed in a rear portion of the outer shroud 14 for vacuuming grass debris. The vacuum module 42 includes a longitudinally-extending vacuum slot 44 that is coupled to the vacuum chamber 20 through a pair of ducts (or other slot-like transition) 46 (as best shown in FIG. 2). The vacuum created by the impeller 28 is used to create a suction force along the extent of the vacuum slot 44. The vacuum module is primarily designed to suction "fine" clippings and the like that are the by-products of grass previously cut but not forced into the ground. These fine cuttings are then recycled through the apparatus by being drawn into the vacuum chamber 20 and then delivered into the pressure chamber 18 where they are then driven back into the ground by the pressurized air or are recut as the mower is advanced. The recycling of the clippings is shown by the arrows 45 and this operation produces ultrafine mulched cuttings (when the discharge duct is sealed).

To enhance the suctioning effect, the vacuum module means 42 further includes an agitator wire 48 or suitable rotating brush supported in the vacuum slot for stirring up grass debris. The wire 48 is preferably a nylon rod that may include small tines or the like. Moreover, the air intake and balance control 13 is shown for convenience in FIG. 1 in the frontal area 39 of the housing. However, this intake may be desirably located adjacent the vacuum module to enhance the operation.

Figure 3:
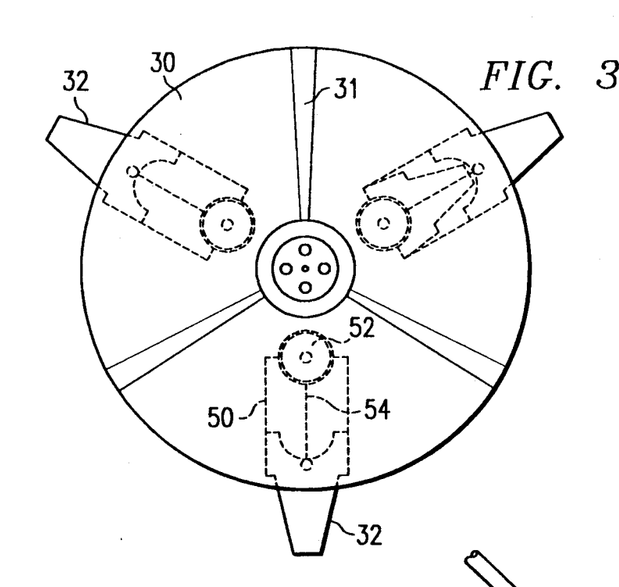
FIG. 3 is a plan view of the preferred cutting disk for use in the apparatus.

Referring now simultaneously to FIGS. 2-3, the cutting disk 30 includes at least one and preferably three retractable cutting blades 32 symmetrically positioned on the cutting disk. The cutting disk supports each of the retractable blades in a slot 50. One end of each slot 50 includes a rotatable spring-recoil spool 52 to which the blade 32 is attached via a cord 54 adapted to be wrapped around the spool 52. Each blade 32 of the cutting disk is thus retractable, the blade being in a first retracted position (with the cord 54 wrapped around the spool 52 as shown in phantom) when the cutting disk is at rest or idling at low speed and a second extended position (with the cord extended from the spool) when the cutting disk is rotated on the shaft 24. The extended position is shown in FIG. 3. This drawing also shows the relative positions of the vertically-extending fans 31 for disturbing the cut grass clippings following cutting as described above. Other air disturbing or fan-like structures may be used. If desired, the blades can be positioned in a stepped arrangement.

Figure 4:
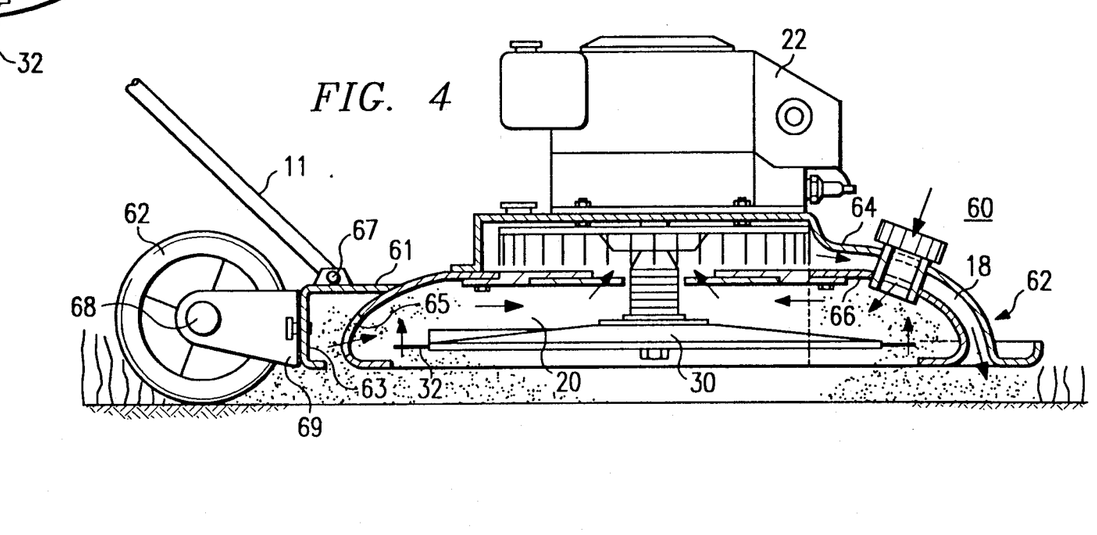
FIG. 4 is a side view, partially cutaway, of a first alternate embodiment of the invention wherein the air-floated apparatus includes an auxiliary drive wheel.

FIG. 4 is a side view, partially cutaway, of a first alternate embodiment of the invention wherein the air-floated apparatus 60 includes an auxiliary drive assembly. In this embodiment, the housing 62 has an outer shroud 64 and the inner shroud 66. The outer shroud 64 surrounds a radial portion (approximately 140 degrees) of the inner shroud along the frontal area 39 of the housing such that the pressure chamber directs the air cushion throughout this predetermined area as opposed to around the substantially 360 degree area (between the inner and outer shrouds 14 and 16) as described above with respect to FIG. 1. The apparatus also includes the vacuum chamber 20 and the cutting disk 30, however, in this embodiment the vacuum module 42 is formed by the rearwardly-extending platform 61 and the vertical wall 63 which extends downwardly from the platform 61. The vacuum module 42 communicates with the vacuum chamber 20 via a slot 65 in the inner shroud 66.

The slot 65 replaces the ducts 46 of FIG. 2. The handle 11 is attached to the pivot assembly 67.

The drive wheel 62 is journaled on axle 68 which is rotatably-supported in the support bracket 69 affixed to the vertical wall 63. The drive wheel may be powered with a suitable A.C. or D.C. variable-speed motor to enable the apparatus to be self-propelled.

Figures 5, 5A:
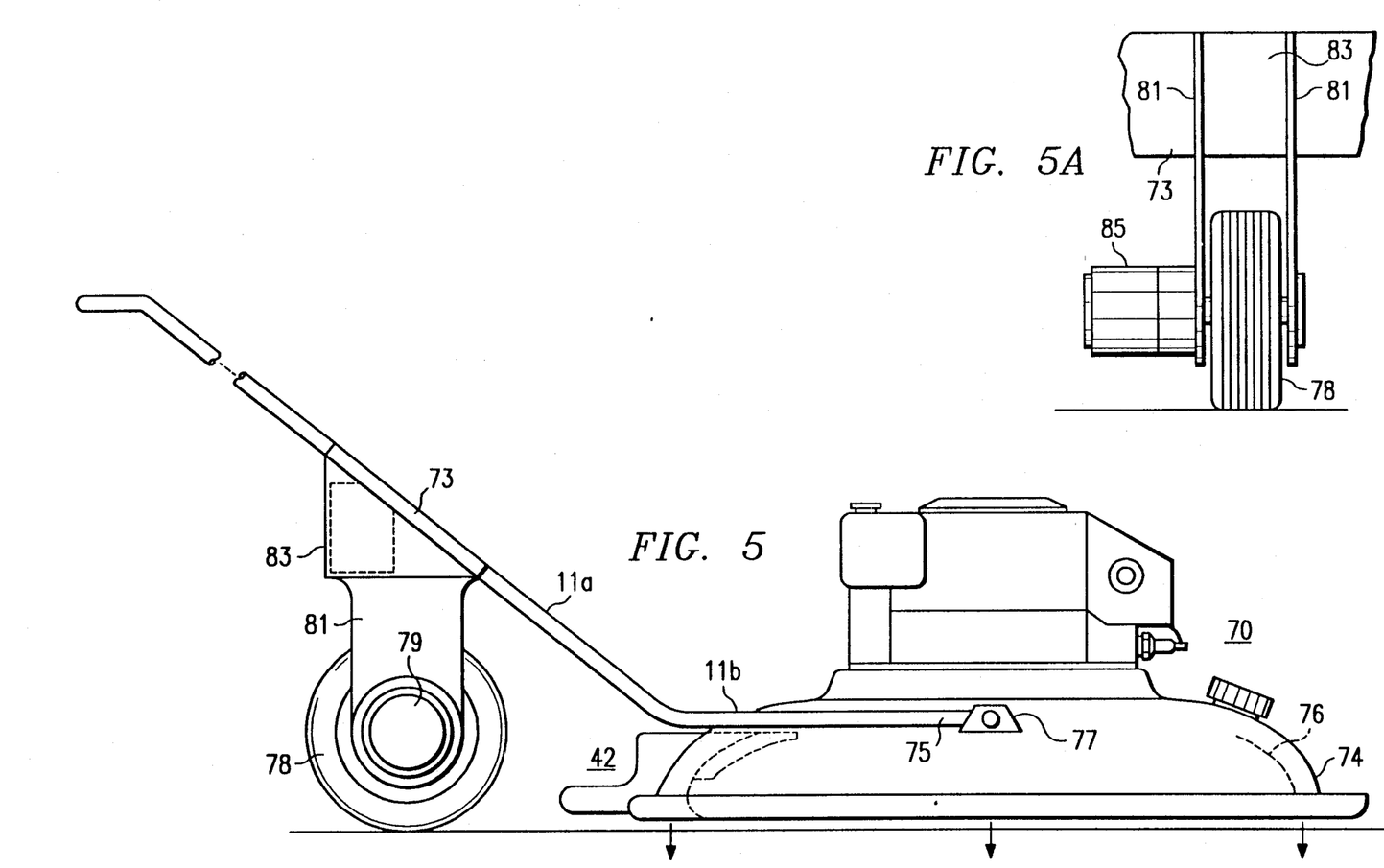
FIG. 5 is a side view of an alternate embodiment of the mower of FIG. 3; wherein the handle of the mower includes an auxiliary drive mechanism for enabling walk-behind self-propelled operation.
FIG. 5A is a back view of the auxiliary drive wheel assembly of the mower of FIG. 5.

FIG. 5 is a side view of an alternate embodiment of the mower of FIG. 1 which extends the use of an auxiliary drive wheel assembly first shown in FIG. 4. In this embodiment, the air-floated apparatus 70 includes an auxiliary drive wheel assembly 71 secured to the handle 11. The housing 72 has an outer shroud 74 and the inner shroud 76 shown in phantom. As in FIG. 1, the outer shroud 74 substantially surrounds the inner shroud such that the pressure chamber directs the air cushion throughout a substantially 360 degree area. The apparatus also includes the vacuum chamber, the cutting disk and the vacuum module as previously described. The handle 11 includes a pair of angled members, one of which is designated by reference numeral 11a, and a pair of horizontal stabilizer members, one of which is shown by reference numeral 11b. The pairs are spaced on opposite sides of the mower and are interconnected by a cross member 73 as best seen in FIG. 5A. The distal end 75 of each horizontal member 11b of the handle is mounted in a pivot assembly, one of which is shown as reference numeral 77. The use of horizontal members 11b of the handle is especially advantageous compared to prior art hover apparatus wherein the handle is attached at a 45 degree angle directly to the housing. Such prior art constructions sometimes make it difficult to float the mower effectively if too much pressure is exerted on the handle and thus against the housing. Excessive force cannot be exerted against the housing 72 of FIG. 5 due to the horizontal stabilizer members and the forward motion of the housing.

The auxiliary drive wheel assembly 71 is shown in side view in FIG. 5A and includes the wheel 78 journaled on axle 79 which is rotatably-supported between the support brackets 81. A cross support member 83 is affixed to the cross member 73 of the handle 11. The wheel, alternatively, is swivel-mounted with respect to the support brackets 81. The wheel is driven by a suitable (preferably variable-speed) motor 85 to facilitate the use of the mower as a walk-behind, self-propelled air-floated apparatus. This construction is advantageous because when the user completes a swath and desires to turn the mower around, the user can simply lift the handle and wheel assembly 71 about the pivot assembly 77 and rotate about the floating housing in a horizontal plane above the ground. Alternatively, if the wheel is swivel-mounted, the handle need not be lifted to effect the turn.

Figure 6:
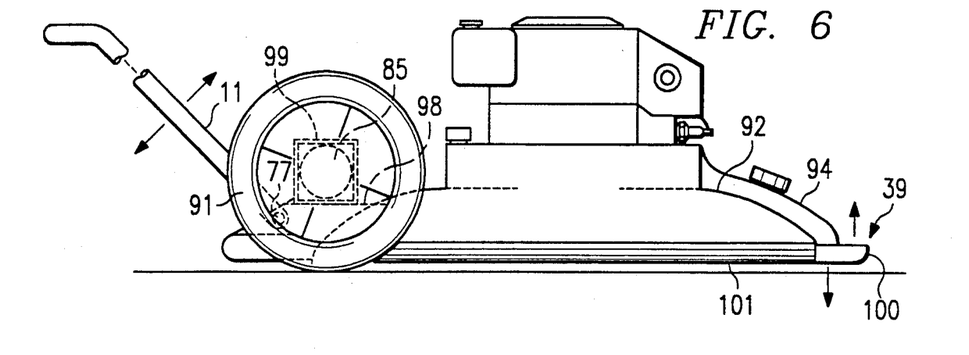
FIG. 6 is a side view of yet another alternate embodiment of the invention wherein the auxiliary drive mechanism is supported on a platform instead of the mower handle.

FIG. 6 is a side view of yet another alternate embodiment of the invention wherein the auxiliary drive mechanism is supported on a platform instead of the mower handle. The air-floated apparatus 90 includes a pair of auxiliary drive wheels, one of which is shown by reference numeral 91. In this embodiment, the housing 92 has an outer shroud 94 and the inner shroud 96. The outer shroud 94 surrounds only a small radial portion of the inner shroud along the extreme frontal area 39 of the housing such that the pressure chamber directs the air cushion throughout this predetermined area as opposed to around the substantially 360 degree area. The apparatus also includes the vacuum chamber and the cutting disk; in this embodiment, the vacuum module is formed in the manner described above with respect to FIG. 4 wherein an internal slot in the inner shroud enables the vacuum slot of the vacuum module to communicate with the vacuum chamber within the inner shroud. The platform 98 supports the wheel-support frame assembly 99 that includes a motor 85 and suitable drive shaft as previously described. The handle 11 is attached in rear-mounted pivot assembly 77.

In the embodiment of FIG. 6, flotation is enhanced by providing the outer shroud with an up-turned frontal lip 100 (along the pressure chamber) and an in-turned lip 101 along the remainder of the outer shroud.

Figure 7:
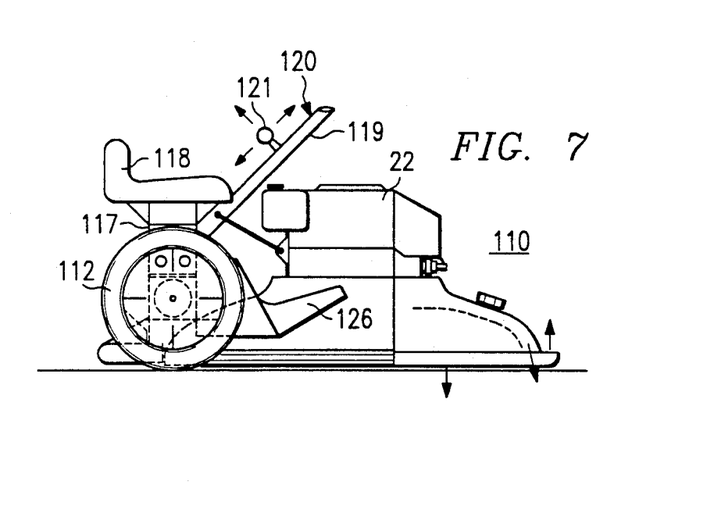
FIG. 7 is a side view of a tractor-type air-floated lawn mower according to the present invention.
Figure 7A:
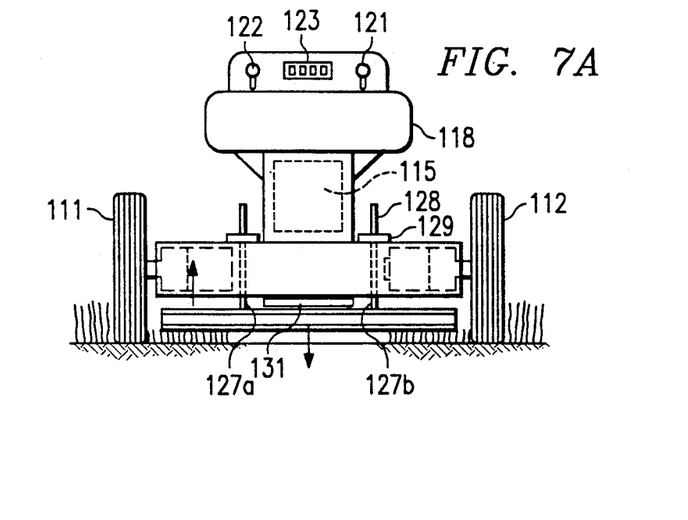
FIG. 7A is a back view of the tractor-type air-floated apparatus of FIG. 7.
Figure 8:
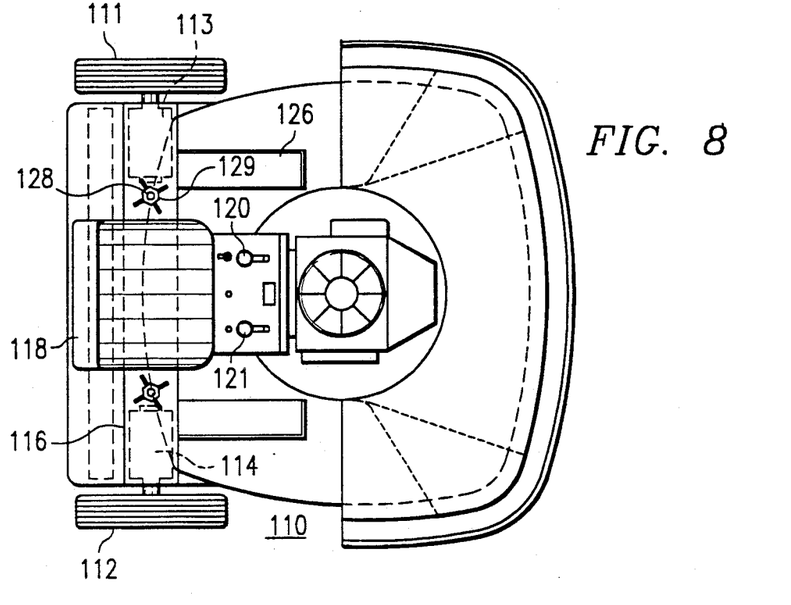
FIG. 8 is a plan view of the mower of FIG. 7 showing the various alternate designs of the outer shroud.

FIG. 7 is a side view of a tractor-type air-floated lawn mower according to the present invention. FIG. 7A is a back view of the apparatus of FIG. 7. The air-floated portion of FIGS. 7-7A is similar to the apparatus of FIGS. 4 and 6 in that only a predetermined frontal portion of the housing is floated through the use of an outer shroud covering a portion of the inner shroud in an air-tight manner. FIG. 8 shows the various different sizes (in phantom) of the outer shroud envisioned by the present invention; the 180 degree embodiment being preferred for the tractor-type mower. Although not shown in detail in FIG. 7, it should be appreciated that the previously-described vacuum chamber structure and retractable cutting disk assembly is also preferably used.

Referring now to FIGS. 7-7A, the tractor 110 includes a pair of auxiliary drive wheels 111 and 112, each of which is separately driven by a suitable drive motor. Drive motor 113 drives wheel 111 and drive motor 114 drives wheel 112. A conventional or rechargeable battery 115 or other suitable power supply (such as a solar-powered source) is used to power the motors 113 and 114. As best seen in FIG. 8, a frame member 116 supports the drive motors 113 and 114 and their associated axles. The battery 115 is preferably supported in a seat support member 117 to which a padded seat 118 is affixed. The seat support member also supports an angled control panel member 119 which includes a control panel 120, a pair of individual joysticks 121 and 122, one for each wheel member, and a suitable digital or other display 123. The panel supports other control devices as necessary such as an electronic ignition and the throttle of the motor 22 used to drive the hover apparatus and cutting blade. The panel member 119 can be secured to the motor housing by the adjustable tether 125 for supporting the housing during transport of the mower from storage. Tether 125 is disengaged during the flotation operations. Foot supports 126 are attached to the outer shroud in a conventional manner.

By individually controlling each wheel (through a separate joystick), the user can rotate the mower in a full 360 degree manner about the housing. This enables the mower to provide a smooth and even cut even as it is turned following mowing of a straight swath.

As also seen in FIG. 7A, the level of the mower housing is vertically-adjustable relative to the frame member 116. In particular, first and second support posts 127a and 127b are rigidly supported in the outer shroud (above the vacuum module) and are received in appropriate channels (not shown) in the frame member. Each of the posts 127 includes a threaded end portion 128 to which an adjustment nut 129 is threadably-secured. Prior to mowing, the level of the housing relative to the frame member is adjusted by manual adjustment of the adjustment nuts 129. Alternatively, one or more linear motors can be used to provide this adjustment automatically. One or more shims 131 are used to maintain the spacing. Preferably, a pair of wedge-shaped indexed shims are used to provide an adjustable degree of spacing. Alternatively, the frame member 116 is molded to the main deck housing directly in which case the positions of the drive motors 113 and 114 are vertically adjustable (and then lockable) relative to the fixed frame member 116.

The ability to adjust the position of the housing deck relative to the wheeled platform has significant advantages. The depth of cut is adjustable by presetting the vertical distance between the wheeled platform and the housing and then dynamically varying the impeller speed (which determines the level of the frontal portion of the housing by varying the mass of the pressurized air cushion). In the present invention, the wheeled assembly counteracts the downward vacuum force; at the same time, the forward portion of the housing is floated. In this manner, a larger mass of pressurized air is concentrated forwardly (or rearwardly if a forward wheel placement is used) to facilitate leveling of the housing using the throttle of the motor 22. Appropriate site leveling means can be provided to facilitate the leveling of the housing.

Figure 9:
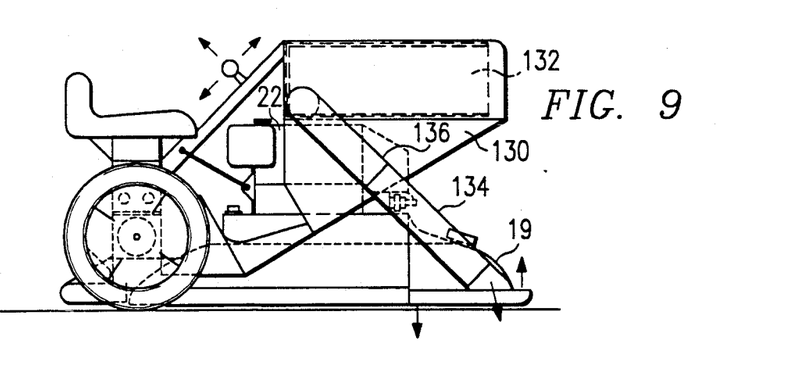
FIG. 9 is a side view of a modified tractor-type air-floated lawn mower which includes grass receptacle means.

FIG. 9 is a side view of a modified tractor-type air-floated lawn mower which includes a main support structure 130 overlying the motor 22 for use in supporting a grass collection receptacle 132. In this embodiment, the impeller 28 is upright (with the vacuum side up) instead of inverted and the discharge duct 19 is used and forwardly-mounted. A pair of flexible sleeves 134 and 136 are used to deliver the cut grass clippings from the discharge duct to the receptacle 132. The sleeve 134 includes a distal end that is slidable within the sleeve 136 so that the sleeves are slidable relative to each other.

Figure 10:
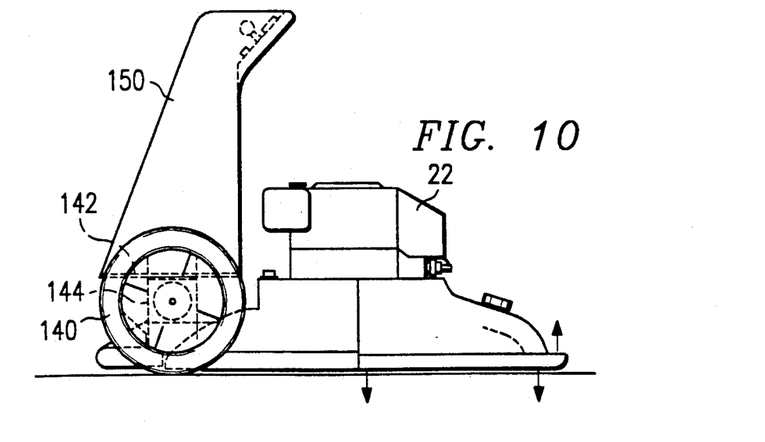
FIG. 10 is a side view of an yet another alternate embodiment of the invention for use as a stand-on air-floated apparatus.

FIG. 10 is a side view of an yet another alternate embodiment of the invention for use as a stand-on or "chariot" type of air-floated apparatus. The chariot includes a rider platform 142 supported on a wheel frame 144. A pair of walls 150 are attached to the platform to form a riding enclosure. As in the tractor-type embodiment, each of the wheels 140 is controlled by a separate motor/joystick control arrangement to facilitate full 360 degree movement of the mower. For example, at the end of a swath, the user can brake one wheel while the other wheel continues to rotate; alternatively, the user can reverse one wheel while the other while continues in forward motion. This arrangement provides significant flexibility and operating functionality.

It should be appreciated by those skilled in the art that the specific embodiments disclosed above may be readily utilized as a basis for modifying or designing other structures for carrying out the same purposes of the present invention. For example, it is envisioned that certain features of the invention, such as the retractable blade mechanism of FIG. 3, are useful in conventional wheeled lawn mowers. Moreover, although the wheeled support assemblies are shown as rear-mounted, they may be forward-mounted with the pressure chamber then located along the rear portion of the housing. It should further be realized by those skilled in the art that such equivalent constructions do not depart from the spirit and scope of the invention as set forth in the appended claims.

What is claimed is:

1. An air-floated apparatus, comprising:
    a housing having an outer shroud and an inner shroud, the outer shroud surrounding a predetermined portion of the inner shroud to define a pressure chamber between the inner and outer shrouds and a vacuum chamber within the inner shroud, the inner shroud having a bottom opening;
    a motor including a rotatable shaft;
    an impeller supported in the pressure chamber and rotatable on the shaft for exhausting air from the vacuum chamber to erect grass underlying the opening while simultaneously pressurizing air in the pressure chamber to float the apparatus above the grass; and
    a cutting disk rotatable on the shaft and supported in the opening of the inner shroud to substantially enclose the vacuum chamber, the cutting disk having at least one blade for cutting the grass.

2. The air-floated apparatus as described in claim 1 further including auxiliary wheeled drive means for supporting a predetermined portion of the housing.

3. The air-floated apparatus as described in claim 1 and further comprising air intake means communicating with said impeller to provide air thereto, said air intake means including adjustment means for varying the amount of vacuum in the vacuum chamber.

4. The air-floated apparatus as described in claim 1 further including vacuum module means supported along a rear portion of the outer shroud and having a vacuum slot, the vacuum module means being coupled to the vacuum chamber to suction cut grass clippings into the slot.

5. The air-floated apparatus as described in claim 4 wherein the suctioned grass clippings are delivered through the vacuum chamber and into the pressure chamber where they are then driven back into the ground by the pressurized air.

6. The air-floated apparatus as described in claim 1 wherein the vacuum module means further includes agitator means supported in the vacuum slot for stirring up grass debris.

7. The air-floated apparatus as described in claim 1 wherein the blade of cutting disk is retractable, the blade being in a first retracted position when the cutting disk is at rest or idling at low speed and a second extended position when the cutting disk is rotated on the shaft.

8. The air-floated apparatus as described in claim 1 wherein the cutting disk includes two or more retractable cutting blades symmetrically positioned on the cutting disk.

9. The air-floated apparatus as described in claim 1 wherein the cutting disk includes one or more vertically-extending fins for stirring up the grass clippings.

10. The air-floated apparatus as described in claim 1 further including impeller clean-out means.

11. The air-floated apparatus as described in claim 1 further including mulching means located between the pressure chamber and the vacuum chamber for recutting cut grass clippings passing therethrough.

12. An air-floated apparatus, comprising:
    a housing having an outer shroud and an inner shroud, the outer shroud surrounding a predetermined portion of the inner shroud to define a pressure chamber between the inner and outer shrouds and a vacuum chamber within the inner shroud, the inner shroud having a bottom opening;
    a motor including a rotatable shaft;
    an impeller supported in the pressure chamber and rotatable on the shaft for exhausting air from the vacuum chamber to erect grass underlying the opening while simultaneously pressurizing air in the pressure chamber to float the housing above the grass;

a cutting disk rotatable on the shaft and supported in the opening of the inner shroud to substantially enclose the vacuum chamber, the cutting disk having at least one blade for cutting the grass;

a vacuum module supported along a rear portion of the outer shroud and having a vacuum slot, the vacuum module being coupled to the vacuum chamber to suction cut grass clippings into the slot; and auxiliary drive means for use in advancing the housing over the grass.

13. The air-floated apparatus as described in claim 12 wherein the apparatus includes a handle having means for supporting the auxiliary drive means.

14. The air-floated apparatus as described in claim 12 wherein the auxiliary drive means is attached to the vacuum module and includes:

at least one wheel;

means for supporting the wheel on the housing; and motor means for rotating the wheel.

15. The air-floated apparatus as described in claim 12 wherein the auxiliary drive means is supported on the vacuum module and includes:

a frame member;

a first drive wheel supported at one end of the frame member and a second drive wheel supported at an opposite end of the frame member; and drive means for driving the first and second drive wheels; first and second drive wheels.

16. The air-floated apparatus as described in claim 15 wherein the drive means includes:

first and second motors for driving the first and second drive wheels, respectively; and control means for independently controlling the first and second motors to enable the first and second wheels to be rotated independently of each other.

17. The air-floated apparatus as described in claim 12 wherein the auxiliary drive means includes:

a frame member having at least one wheel rotatably secured thereto; and means for adjusting a position of the housing relative to the frame member.

18. The air-floated apparatus as described in claim 12 wherein the auxiliary drive means includes a stand-on rider platform.

19. An air-floated apparatus, comprising:

a housing having an outer shroud and an inner shroud, the outer shroud surrounding a predetermined portion of the inner shroud to define a pressure chamber between the inner and outer shrouds adjacent a front of the housing, and to define a vacuum chamber within the inner shroud, the inner shroud having a bottom opening;

a motor including a rotatable shaft;

an impeller supported in the pressure chamber and rotatable on the shaft for exhausting air from the vacuum chamber to erect grass underlying the opening while simultaneously pressurizing air in the pressure chamber to float the front of the housing above the grass;

a cutting disk rotatable on the shaft and supported in the opening of the inner shroud to substantially enclose the vacuum chamber, the cutting disk having at least one blade for cutting the grass; and auxiliary wheeled drive means for use in advancing the housing over the grass.

* * * * *